(12) United States Patent
Regairaz

(10) Patent No.: US 12,368,910 B2
(45) Date of Patent: Jul. 22, 2025

(54) SYSTEM AND METHOD FOR CALCULATING A DISTRIBUTOR QUALITY SCORE

(71) Applicant: Xandrie SA, Pantin (FR)

(72) Inventor: Axel Regairaz, Pantin (FR)

(73) Assignee: XANDRIE SA, Pantin (FR)

(*) Notice: Subject to any disclaimer, the term of this patent is extended or adjusted under 35 U.S.C. 154(b) by 211 days.

(21) Appl. No.: 17/836,378

(22) Filed: Jun. 9, 2022

(65) Prior Publication Data

US 2023/0403418 A1    Dec. 14, 2023

(51) Int. Cl.
| | |
|---|---|
| *G06F 16/683* | (2019.01) |
| *G06Q 10/0639* | (2023.01) |
| *H04L 65/80* | (2022.01) |
| *H04N 21/2368* | (2011.01) |

(52) U.S. Cl.
CPC ....... *H04N 21/2368* (2013.01); *G06F 16/683* (2019.01); *G06Q 10/06395* (2013.01); *H04L 65/80* (2013.01)

(58) Field of Classification Search
CPC . G06F 16/683; G06Q 10/06395; H04L 65/80; H04N 21/2368; H04N 21/25891; H04N 21/4394; H04N 21/4622; H04N 21/4667; H04N 21/4756

USPC ......................................................... 348/423
See application file for complete search history.

(56) References Cited

U.S. PATENT DOCUMENTS

| | | | | |
|---|---|---|---|---|
| 2014/0258467 | A1* | 9/2014 | Barrand | H04L 51/52 |
| | | | | 709/219 |
| 2015/0381663 | A1* | 12/2015 | Zhao | H04L 43/062 |
| | | | | 370/260 |
| 2019/0306100 | A1* | 10/2019 | Guthery | G10L 15/26 |
| 2020/0127842 | A1* | 4/2020 | Winarski | H04N 21/85406 |
| 2020/0374586 | A1* | 11/2020 | Kumar | H04N 21/4333 |
| 2020/0412975 | A1* | 12/2020 | Al Majid | G10L 25/60 |

* cited by examiner

*Primary Examiner* — William C Vaughn, Jr.
*Assistant Examiner* — Astewaye Gettu Zewede
(74) *Attorney, Agent, or Firm* — Panitch Schwarze Belisario & Nadel LLP

(57) ABSTRACT

A method and system are provided for calculating a distributor quality score. At least one audio file is sent from a distributor server to at least one user terminal. In each of the at least one user terminal, a distributor identifier is added in the metadata of each of the at least one audio file. For each of the at least one audio file, the audio file is analyzed in order to generate at least one file quality indicator. In a rating server, a distributor quality score is calculated based on the at least one file quality indicator.

10 Claims, 4 Drawing Sheets

SYSTEM AND METHOD FOR CALCULATING A DISTRIBUTOR QUALITY SCORE

BACKGROUND OF THE INVENTION

1. Field of the Invention

The present invention is in the field of audio files distribution. It concerns more particularly a system and a method for calculating a distributor quality score.

2. Background

Audio content, particularly music, is today mainly consumed through digital services. These services are provided by content providers, called in the present invention "distributors". Some distributors offer to their customers the possibility to download audio files on their user terminals, for example smartphones, tablets or personal computers. Many distributors exist, delivering different levels of quality of service. There is a need for the overall quality of service to be raised, in order to make better quality audio files available to all users.

SUMMARY OF THE INVENTION

One object of the present invention is to increase the quality of service offered by distributors to audio files users.

Another object of the present invention is to give the possibility to audio file users to get better quality files.

The purpose of the present invention is to respond at least in part to the above-mentioned objects by proposing a method evaluating the quality of audio files coming from a distributor using one or more quality indicators, and aggregating the results into a distributor quality score. For this purpose, it proposes a method for calculating a distributor quality score, comprising at least the following steps:

sending at least one audio file from a distributor server to at least one user terminal, in each of the at least one user terminal, adding a distributor identifier in the metadata of each of said at least one audio file, for each said at least one audio file, analyzing said audio file in order to generate at least one file quality indicator, in a rating server, calculating a distributor quality score based on the at least one file quality indicator.

Thanks to these provisions, this method can be applied to all distributors of audio files, and provide a way to objectively measure the quality of their audio files. This allows users to select audio files with better quality, and incites distributors to improve their quality of service.

According to other characteristics:

at least two audio files may be sent from the distributor server to the at least one user terminal, which increases the accuracy of the distributor quality score, the calculating step may comprise the two following sub-steps:

for each said at least two audio files, calculating a file quality score based on the at least one file quality indicator, calculating said distributor quality score based on said at least two file quality scores, the file quality score can then be used to calculate distributor quality scores with different type of aggregations, for instance per region, per user, per artist, etc, and/or the file quality score can be sent back to the user who sent the audio file, for each said at least one audio file, at least two file quality indicators may be generated, which increases the accuracy of the distributor quality score, the measured quality taking more parameters into account, at least one of the at least one file quality indicator may be an audio quality indicator, which is one of the main quality types that concern audio file, said method may further comprise the following steps for each audio file:

in the user terminal, offer a human user the possibility to add audio quality flags in the metadata of said audio file, generating said audio quality indicator based on an analysis of audio quality flags, which is an efficient way to generate a human-based audio quality indicator, said audio quality indicator may be generated based on a quality check program, which is an efficient way to generate a computer-based audio quality indicator, said quality check program may compare said audio file with a reference audio file, at least one of the at least one file quality indicator is a metadata quality indicator, which allows to widen the scope of the distributor quality score, said method may further comprise the following steps for each audio file:

in the user terminal, offer a human user the possibility to add metadata quality flags in the metadata of said audio file, generating said metadata quality indicator based on an analysis of metadata quality flags, which improves globally the relevance of the quality measurements, said method may further comprise the following steps for each audio file:

before sending the audio file from the distributor server to the at least one user terminal, in the distributor server, calculating a first hash of at least part of the metadata of said audio file, and store said first hash into a blockchain, calculating a second hash of at least part of the metadata of said audio file, generating said metadata quality indicator based on the comparison between said first hash and said second hash, which is a reliable way to detect any modification in metadata.

The present invention also concerns a method for comparing at least two distributors, comprising the following steps:

for each distributor, calculating a distributor quality score following a method according to the invention, comparing the calculated distributor quality scores to compare the distributors.

Thanks to these provisions, this method can be applied to all distributors of audio files, and provide a way to objectively compare the quality of their audio files. This allows users to select audio files with better quality, and incites distributors with low scores to improve their quality of service.

The present invention further concerns a method for calculating at least two regional distributor quality scores, comprising at least the following steps:

sending at least one audio file from a distributor server to at least two user terminals located in two different geographical regions, in each of said at least two user terminals, adding a distributor identifier in the metadata of said at least one audio file, for each of said two different geographical regions:

for each file sent to a terminal user located in said geographical region, analyzing said audio file in order to generate at least one file quality indicator, in the rating server, calculating at least one regional distributor quality score based on said at least one quality indicator.

Thanks to these provisions, this method can be applied to all distributors of audio files in a particular region, and provide a way to objectively measure the quality of the audio files they distribute in said particular region. This allows users to select audio files with better quality, and incites distributors with low scores in certain regions to improve their quality of service in said regions.

The present invention finally concerns a system for calculating a distributor quality score, comprising a distributor server, at least one user terminal and a rating server, wherein:

said distributor server comprises a sending module configured to send at least one audio file to said at least one user terminal, said user terminal comprises:

a receiving module configured to receive said at least one audio file from said distributor server, a distributor identifier module configured to add a distributor identifier in the metadata of said at least one audio file, and said system comprises an analyzing module configured to analyze said at least one audio file in order to generate at least one file quality indicator, and said rating server comprises a calculating module configured to calculate a distributor quality score based on the at least one file quality indicator.

Thanks to these provisions, this system can be used to calculate a distributor quality score for all distributors of audio files, and provide a way to objectively measure the quality of their audio files. This allows users to select audio files with better quality, and incites distributors to improve their quality of service.

BRIEF DESCRIPTION OF THE DRAWINGS

The present invention will be better understood by reading the detailed description which follows, with reference to the annexed figures in which.

DETAILED DESCRIPTION OF THE INVENTION

Figure 1:
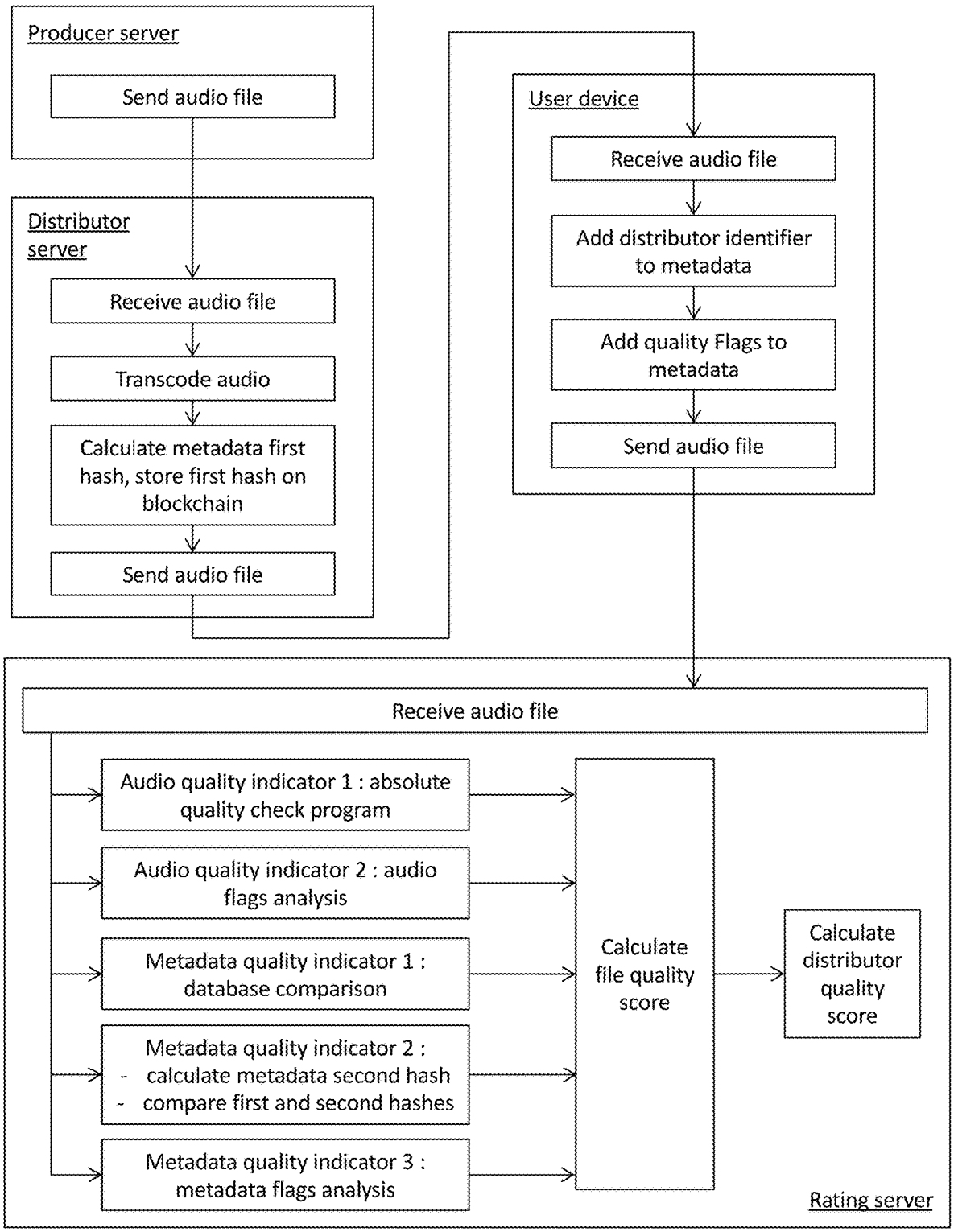
FIG. 1 is a flow chart describing a particular embodiment of a method of the present invention.

The method according to the invention, a particular embodiment of which is illustrated in FIG. 1, is for calculating a distributor quality score and comprises at least the following steps:

sending at least one audio file from a distributor server to at least one user terminal (illustrated in FIG. 1 as the fourth step of the "Distributor server" block). Prior to this, the audio file may have been sent from a producer server to a distributor server, and/or the distributor may have encoded the audio file into a desired format and quality.

In this step, the distributor is a distributor of audio files, containing for example music, to users, in particular to the public. This step is usually triggered by a purchase of the audio file by the user of the user terminal from the distributor, but in some cases the distributor may send the audio file without any payment required. The user terminal may be any terminal able to download an audio file, for example a smartphone, a tablet or a personal computer. In this step, one or several audio files may be sent to a single user terminal, or to several user terminals. The same audio files may be sent to different user terminals, or different audio files may be sent to different user terminals. In case more than one audio file is sent, the audio files may be sent following any timing: at the same time, over a few minutes or over a few years. In case more than one audio file is sent in this step, the audio files may be sent from different distributor servers, as long as they are all operated by the same distributor.

in each of the at least one user terminal, adding a distributor identifier in the metadata of each of said at least one audio file (illustrated in FIG. 1 as the second step of the "User device" block).

In this step, the distributor identifier is unique to a particular distributor. So in the present method for calculating a score for a particular distributor, this identifier is preferably the same for all the audio files coming from said distributor, in each user terminal.

for each said at least one audio file, analyzing said audio file in order to generate at least one file quality indicator (illustrated in FIG. 1 as the five "quality indicator" steps of the "Rating server" block).

This step may for instance take place in the user device, or in a rating server.

In case it takes place in the rating server, it is preceded by a step of sending of said at least one audio file from said at least one user terminal to the rating server (illustrated in FIG. 1 as the fourth step of the "User device" block).

In case it takes place in the user device, it may be followed by a step of sending the at least one file quality indicator to the rating server.

in the rating server, calculating a distributor quality score based on the at least one file quality indicator (illustrated in FIG. 1 as the last step of the "Rating server" block).

The rating server may be operated by a distributor, who wants to evaluate its own quality and/or other distributors quality. Otherwise, the rating server may be operated by an independent organization.

In most cases, there is more than one value for each file quality indicator, because more than one audio file will be analyzed in the previous step. In this case, for each audio file, the at least one file quality indicator can be used to calculate a file quality score. This is particularly useful when more than one file quality indicator is calculated for each audio file. The distributor quality score can then be an aggregation of file quality scores, for example an average or a median of all the file quality scores. The distributor quality score may also be an average of the average file quality score per user, an average of the average file quality score per country, an average of the average file quality score per artist, etc. In case there is only one file quality indicator, the distributor quality score can be the unique file quality score. In case there are at least two file quality indicators, their values, that might be of different formats, are aggregated in the distributor quality score. The distributor quality score is for example a score between 0 and 5 with one digit after the comma. It can then be displayed as a number of stars on a report issued by the operator of the rating server.

This method may rely on a user sending an audio file to a rating server, or on a user generating a file quality indicator or a file quality score and sending it to the rating server. It is therefore necessary for the user to accept to participate to the calculation of the distributor quality score. In exchange for participating, the user may receive a report on the quality of his own audio files, for example the audio file quality score described below. In case the report shows that an audio file has a low quality score, the user may be offered a source of high quality files, for example a list of distributors having a high distributor quality score.

The processing, in the rating server, of file quality indicators to obtain the distributor quality score can be repeated periodically in order to include audio files, file quality indicators or file quality scores recently sent by users. The distributor quality score may for instance be updated daily, weekly or monthly. It is also possible to exclude from the calculation quality indicators calculated based on older files, so that the distributor quality score reflects the current quality of service of the distributor. For example, quality indicators calculated based on audio files, file quality indicators or file quality scores sent by users more than one year prior to the calculation of the distributor quality score may be ignored.

This method may be implemented with a single quality indicator, or with several quality indicators. In case the method is implemented with more than one quality indicator, one or more of these quality indicators may not be calculated for each audio file. The reason is that some quality indicators may not be available for some audio files, or may not apply to some audio files.

The file quality indicators described below may each be used as a single quality indicator. Alternatively, a selection or all of them may be combined together to calculate the distributor quality score.

At least one of the file quality indicators may be an audio quality indicator, and be based on the audio quality of the audio file. Different audio quality indicators may be used, some involving an action from a human user and others being calculated without human intervention.

The audio quality indicator may be based on human raised flags. In the user terminal, the user may be given a specific interface, offering him the possibility to add audio quality flags in the metadata of his audio files. After this step, the flags are available to be analyzed, for instance in the user device or in the rating server. The flags may be associated with a timestamp in the audio file, and a description written by the user. The analysis of the flags may comprise an analysis of the description, to determine the number of "negative" flags in the audio file, i.e. flags where the user identifies a problem in the audio. The audio quality indicator may then be, for instance, an integer representing this number of negative flags. The method may include taking into account the status of the user raising a flag. Some users may for instance be labelled as "golden ear" users, and the flags they raise may be given more credit than other users.

Figure 2:
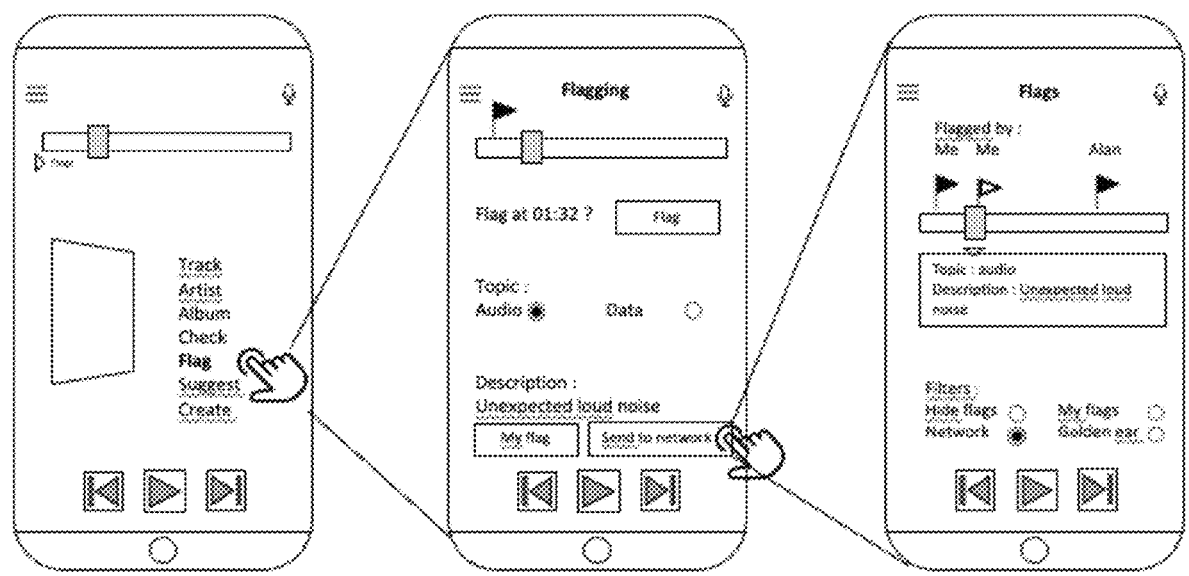
FIG. 2 is an example of a graphical user interface offering to a user the possibility to add flags to an audio file.

FIG. 2 illustrates an example of a graphical human interface for inserting flags in the metadata of an audio file. In this example, the audio file reader comprises a "Flag" button. After clicking on this button, the user has the possibility to add a flag with the following indications: timestamp (01:32 in the example), type of flag (audio in the example), and description ("Unexpected loud noise" in the example). The user may send the flag to the network, in order to share it with a user community, or for example the distributor. He can also choose to not send it to the network, and keep it in the audio file metadata. Finally, the flag can be made visible when reading the audio file, along with other flags previously added by the user or by another user who shared it.

The audio quality indicator may also be based on a quality check program running in the rating server. This program may be an absolute quality check program and rely on known techniques such as checking the actual audio quality versus the audio quality claimed in the metadata. It can also be a program using artificial intelligence to detect abnormal sounds. This program may also be a relative quality check, and compare the audio file with a reference audio file.

At least one of the file quality indicators may be an audio quality indicator, and be based on the accuracy of the metadata of the audio file. Different metadata quality indicators may be used, some involving an action from a human user and others being calculated without human intervention.

The metadata quality indicator may be based on human raised flags. In the user terminal, the user may be given a specific interface, offering him the possibility to add metadata quality flags in the metadata of his audio files. After this step, the flags are available to be analyzed, for instance in the user device or in the rating server. A description written by the user may be joined to the flag, allowing the user to describe the issue. The analysis of the flags may comprise an analysis of the description, to determine the number of "negative" flags in the audio file, i.e. flags raising a problem identified by the user in the metadata. The metadata quality indicator may then be, for instance, an integer representing this number of negative flags.

The metadata quality indicator may also be based on a quality check program running, for instance in the user device or in the rating server. This program may be an absolute quality check program and rely on known techniques such as checking the actual audio quality versus the audio quality claimed in the metadata. This program may also check the metadata against a reference database.

Finally, the metadata quality indicator may rely on a blockchain. In this case, the method for calculating the distributor quality score comprises the following steps:
    before sending the audio file from the distributor server to the at least one user terminal, in the distributor server, calculating a first hash of at least part of the metadata of said audio file, and store said first hash into a blockchain, calculating a second hash of at least part of the metadata of said audio file, for instance in the rating server or in the user device, in the rating server, generating a metadata quality indicator based on the comparison between said first hash and said second hash. The metadata quality indicator may then be Boolean: either the first and second hashes are identical, either they are not; if they are not, it means that the metadata has been corrupted.

The method for calculating distributor quality scores described above may be applied to several distributors. The scores obtained may then be compared. This comparison gives an objective measure of the quality of each distributor, and shows which distributor offers a high quality of service.

If different file quality indicators are used, each of them may be aggregated per distributor to show which are the strengths and weaknesses of each distributor in different areas such as audio and metadata.

The quality indicators may also be aggregated per region, in order to obtain a regional distributor quality score, by applying the following method:

sending at least one audio file from a distributor server to at least two user terminals located in two different geographical regions, in each of said at least two user terminals, adding a distributor identifier in the metadata of said at least one audio file, for each of said two different geographical regions:
in the user device or in the rating server, for each file sent to a terminal user located in said geographical region, analyzing said audio file in order to generate at least one file quality indicator,
in the rating server, calculating at least one regional distributor quality score based on said at least one quality indicator.

The regional distributor score is particularly useful when some distributors tend to offer different quality of services across different regions. The users of a particular region then have a more accurate information on which quality is offered in their region for each distributor, and can select the distributor accordingly. The regions may be geographical and for instance be North America, South America, Europe, Africa, Central Asia, East Asia and Oceania. The regions may also be countries. In another embodiment, the regions may be logical and represent different types of physical networks, distributor servers, internet providers, residential gateways, etc.

Figure 3:
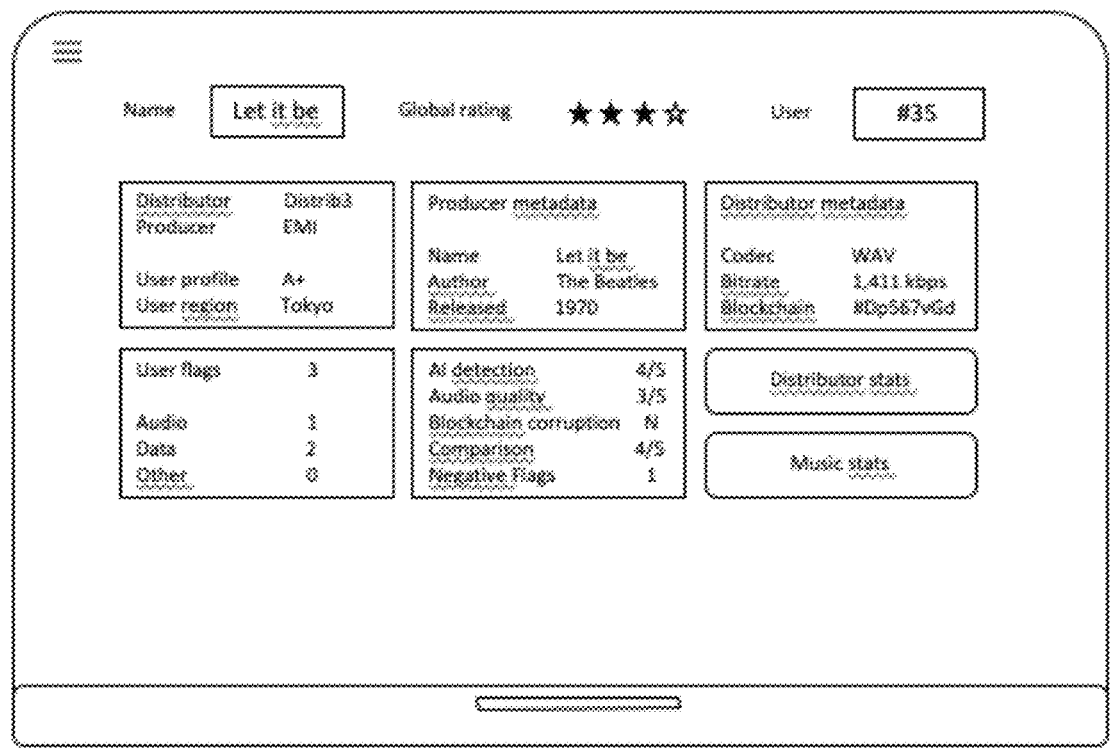
FIG. 3 is an example of a graphical human interface showing a file quality score of a given audio file.

FIG. 3 illustrates an example of a graphical human interface showing a file quality score for a given audio file, ("Let it be" in this example, sent by user "#35"). It shows the "Global rating", e.g. the file quality score (3 out of 4 stars in this example), and other relevant information:

general information: the names of the Distributor ("Distrib3") and Producer ("EMI"), the User profile ("A+") and region ("Tokyo"), producer metadata (name of the audio file: "Let it be", author: "The Beatles", release date: "1970"), distributor metadata (codec used for encoding the audio file: "WAV", Bitrate: "1,411 kbps", and hash of the metadata: "#Dp567vGd). The hash of the metadata can be stored in a blockchain, as explained below, User flags: 3 in this example, among which 1 related to audio, and 2 to metadata, Results of the quality checks: score of AI detection of abnormal sounds (4/5 in this example), score of audio quality check (4/5 in this example), corruption of metadata detected using the blockchain (no corruption in this example), score of a relative quality check (4/5 in this example), number of negative flags (1 in this example, among the 3 flags raised by the user).

This dashboard also proposes buttons to access statistics related to the distributor, or to this specific audio file.

Figure 4:
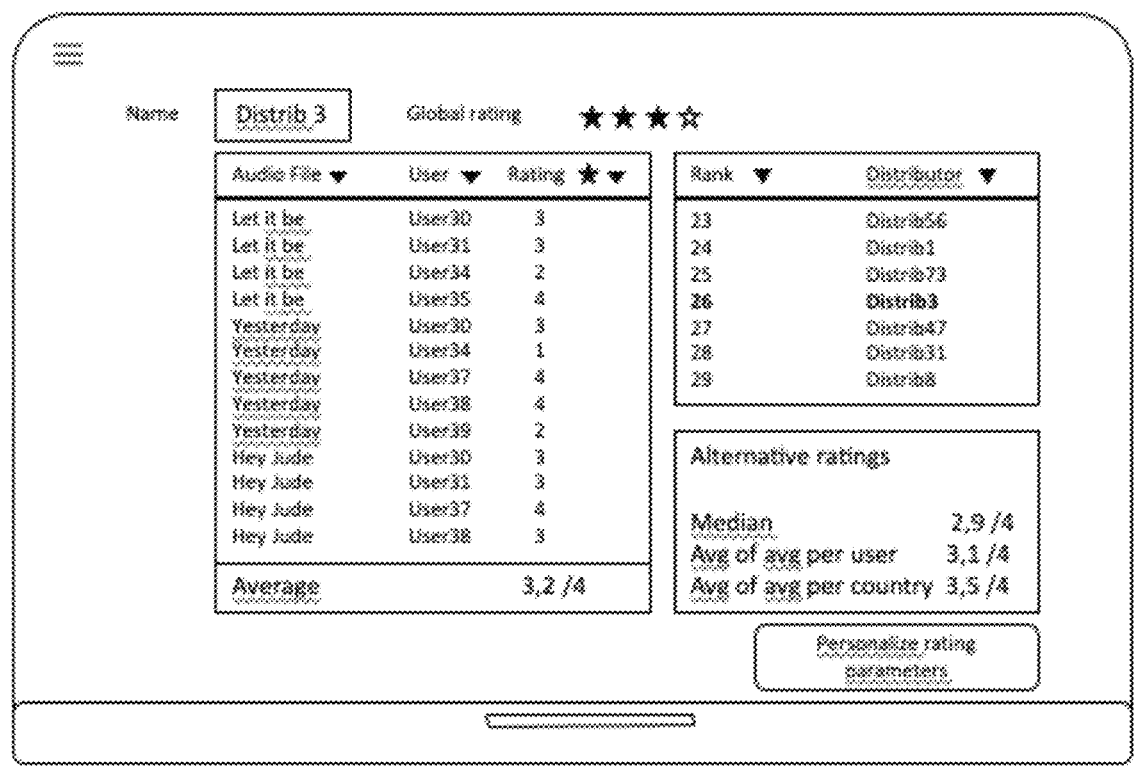
FIG. 4 is an example of a graphical human interface showing a distributor quality score.

FIG. 4 illustrates an example of a graphical human interface showing a distributor quality score (in this example, for the distributor "Distrib 3"). It shows the "Global rating", e.g. the distributor quality score (3 out of 4 stars in this example), and other relevant information:

a file quality score for each audio file taken into account, with a user identifier for each audio file. In this example, the distributor quality score is 3,2/4, and it is the average of all the file quality scores, a rank of all the distributors, based on their distributor quality score (in this example, "Distrib 3" is ranked $26^{th}$), alternative ways of aggregating file quality scores in order to calculate the distributor quality score: median (results is 2,9/4 in this example), average per user (results is 3,1/4 in this example), average per country (results is 3,5/4 in this example).

Figure 5:
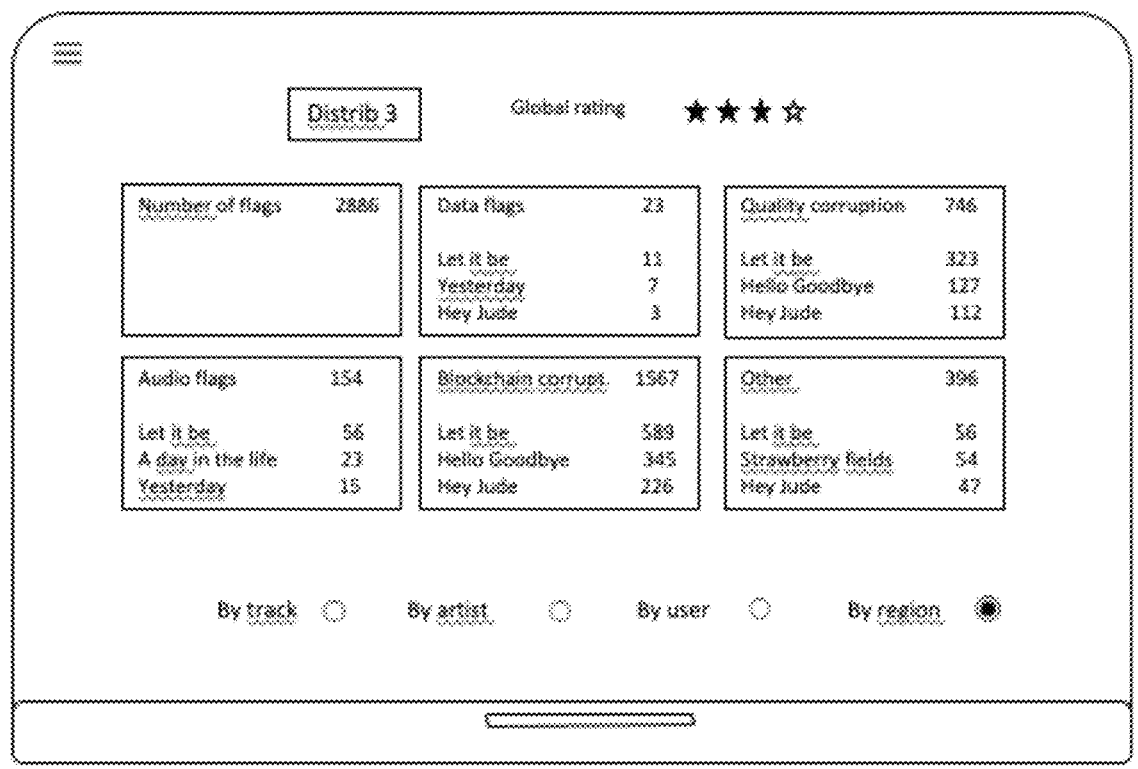
FIG. 5 is another example of a graphical human interface showing a distributor quality score.

FIG. 5 illustrates another example of a graphical human interface showing a distributor quality score (in this example, for the distributor "Distrib 3"). It shows the "Global rating", e.g. the distributor quality score (3 out of 4 stars in this example), and other relevant information:

total number of flags raised for all the audio files of this distributor (in this example 2886), number of data flags (in this example 23), with the three songs for which most audio flags have been raised, number of occurrences of quality corruption, being defined for example as the score of a quality test being below a certain threshold (in this example 746), with the three songs for which most audio flags have been raised, number of audio flags (in this example 154), with the three songs for which most audio flags have been raised, other problems identified with these files (in this example 154), with the three songs for which most audio flags have been raised.

All this information can for example be filtered by track, by artist, by user or by region.

Figure 6:
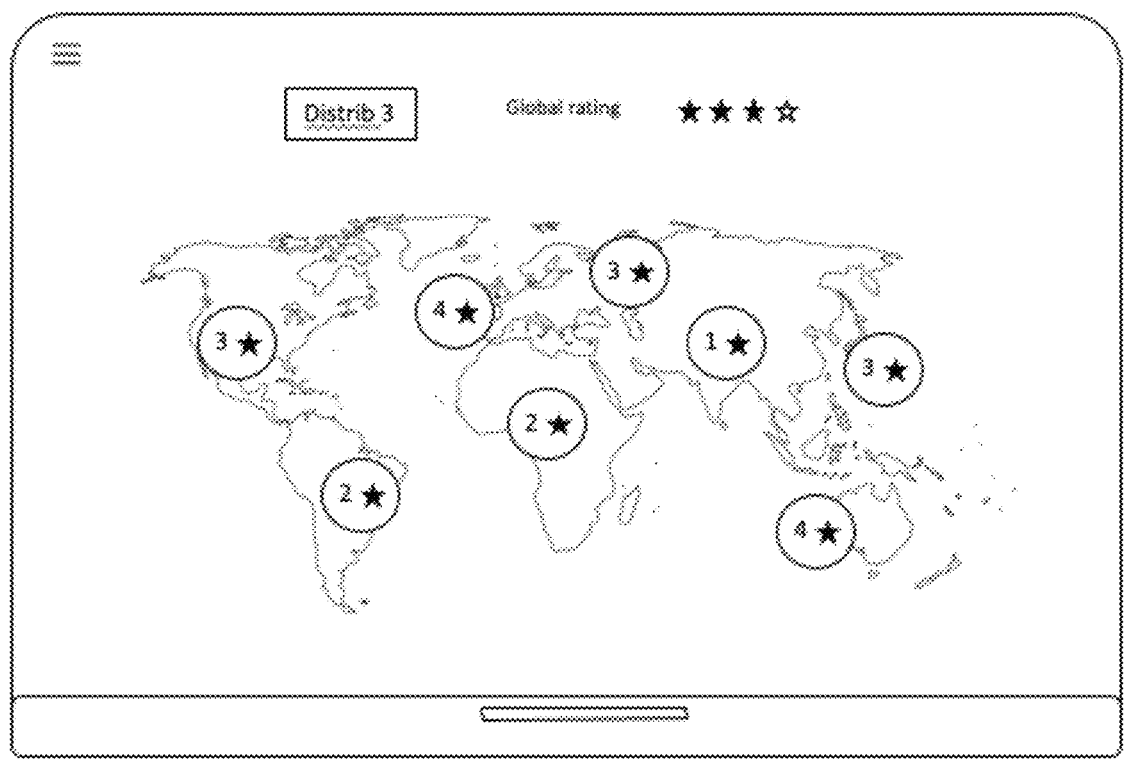
FIG. 6 is an example of a graphical human interface showing regional distributor quality scores.

FIG. 6 illustrates an example of a graphical human interface showing regional distributor quality scores on a world map. These scores may be highly variable across regions; this shows the interest of calculating these scores.

The present invention also concerns a system for calculating a distributor quality score, comprising a distributor server, at least one user terminal and a rating server, wherein:

said distributor server comprises a sending module configured to send at least one audio file to said at least one user terminal, said user terminal comprises:
a receiving module configured to receive said at least one audio file from said distributor server,
a distributor identifier module configured to add a distributor identifier in the metadata of said at least one audio file, and
a sending module configured to send said at least one audio file to said rating server, said system, for instance said rating server or said user device, comprises an analyzing module configured to analyze said at least one audio file in order to generate at least one file quality indicator, and said rating server comprises a calculating module configured to calculate a distributor quality score based on the at least one file quality indicator.

This invention helps users who want to choose high quality sources for their audio files, and gives an incentive to distributors to improve the quality of their services. Ultimately, the consequence is an increase in the overall quality of the audio files downloaded by users, because the best distributors attract more users, and the others try to increase the quality of their audio files.

Although the above description is based on particular embodiments, it is in no way limiting the scope of the invention, and modifications may be made, in particular by substitution of technical equivalents or by different combinations of all or part of the characteristics developed above.

What is claimed is:

1. A method for calculating a distributor quality score, comprising at least the following steps:
   sending at least two audio files from a distributor server to at least one user terminal, wherein the at least two audio files have different content,
   in each of the at least one user terminal, adding a distributor identifier in the metadata of each of said at least two audio files,
   for each said at least two audio files, analyzing said audio files in order to generate at least one file quality indicator,
   in a rating server, calculating a distributor quality score based on the at least one file quality indicator,
   wherein the calculating step comprises the two following sub-steps:
      for each said at least two audio files, calculating a file quality score based on the at least one file quality indicator, thereby calculating at least two file quality scores, wherein at least one of the at least one file quality indicator is an audio quality indicator, and
      calculating said distributor quality score based on said at least two file quality scores, and
   wherein the following steps are performed for each audio file:
   in the user terminal, offer a human user the possibility to add audio quality flags in the metadata of each of said at least two audio files, and
   generating said audio quality indicator based on an analysis of audio quality flags, wherein said audio quality indicator is generated based on a quality check program, and wherein said quality check program compares each of said at least two audio files with a reference audio file, and
   further comprising the following steps for each of said at least two audio files:
   before sending each of said at least two audio files from the distributor server to the at least one user terminal, in the distributor server, calculating a first hash of at least part of the metadata of each of said at least two audio files, and store said first hash into a blockchain,
   calculating a second hash of at least part of the metadata of each of said at least two audio files, and
   generating said metadata quality indicator based on the comparison between said first hash and said second hash.

2. The method according to claim 1, wherein for each said at least two audio files, at least two file quality indicators are generated.

3. A method for comparing at least two distributors, comprising the following steps:
   for each distributor, calculating a distributor quality score following a method according to claim 2,
   comparing the calculated distributor quality scores to compare the distributors.

4. The method according to claim 1, wherein at least one of the at least one file quality indicator is a metadata quality indicator.

5. The method according to claim 4, further comprising the following steps for each audio file:
   in the user terminal, offer a human user the possibility to add metadata quality flags in the metadata of each of said at least two audio files,
   generating said metadata quality indicator based on an analysis of metadata quality flags.

6. A method for comparing at least two distributors, comprising the following steps:
   for each distributor, calculating a distributor quality score following a method according to claim 5,
   comparing the calculated distributor quality scores to compare the distributors.

7. A method for comparing at least two distributors, comprising the following steps:
   for each distributor, calculating a distributor quality score following a method according to claim 4,
   comparing the calculated distributor quality scores to compare the distributors.

8. A method for comparing at least two distributors, comprising the following steps:
   for each distributor, calculating a distributor quality score following a method according to claim 1,
   comparing the calculated distributor quality scores to compare the distributors.

9. A method for comparing at least two distributors, comprising the following steps:
   for each distributor, calculating a distributor quality score following a method according to claim 1,
   comparing the calculated distributor quality scores to compare the distributors.

10. A method for comparing at least two distributors, comprising the following steps:
    for each distributor, calculating a distributor quality score following a method according to claim 1,
    comparing the calculated distributor quality scores to compare the distributors.

* * * * *